United States Patent
Salmisuo

(10) Patent No.: US 6,656,327 B2
(45) Date of Patent: Dec. 2, 2003

(54) METHOD AND DEVICE FOR THE PRODUCTION OF PURE STEAM

(75) Inventor: Mauri J. Salmisuo, Tuusula (FI)

(73) Assignee: Steris Europe, Inc. Suomen Sivuliike, Tuusula (FI)

(*) Notice: Subject to any disclaimer, the term of this patent is extended or adjusted under 35 U.S.C. 154(b) by 192 days.

(21) Appl. No.: 09/961,021

(22) Filed: Sep. 21, 2001

(65) Prior Publication Data

US 2002/0038760 A1 Apr. 4, 2002

(30) Foreign Application Priority Data

Sep. 25, 2000 (FI) .............................. 20002104

(51) Int. Cl.⁷ .............................. B01D 1/22; B01D 3/02; C02F 1/08
(52) U.S. Cl. .................. 203/10; 122/491; 159/6.1; 159/13.2; 159/49; 159/31; 159/DIG. 2; 202/197; 202/236; 203/40; 203/89
(58) Field of Search ................. 202/197, 238, 202/236, 259, 260, 185.5; 159/6.1, 27.3, 13.1, 13.2, 31, 14, 27.1, 49, DIG. 2, DIG. 23; 122/491; 203/10, 40, 89

(56) References Cited

U.S. PATENT DOCUMENTS

| 2,996,286 A | * | 8/1961 | Trepaud ................... 62/471 |
| 3,004,590 A | * | 10/1961 | Rosenblad ................ 159/13.3 |
| 3,875,017 A | | 4/1975 | Saari et al. ................ 202/174 |
| 4,054,485 A | | 10/1977 | Linder et al. ............... 159/6 W |
| 4,059,419 A | * | 11/1977 | Ross ....................... 95/214 |
| 4,375,386 A | * | 3/1983 | Windham ................... 159/31 |
| 4,629,481 A | * | 12/1986 | Echols ..................... 55/348 |
| 5,246,541 A | | 9/1993 | Ryham ..................... 159/13.2 |
| 5,983,842 A | | 11/1999 | Nishi ...................... 122/491 |
| 6,059,934 A | * | 5/2000 | Stober et al. ............... 203/40 |

FOREIGN PATENT DOCUMENTS

| DE | 3804245 A1 | 8/1989 |
| JP | 6288501 | 10/1994 |

OTHER PUBLICATIONS

Osmonics, "Pure Water Handbook", 1997.

* cited by examiner

Primary Examiner—Virginia Manoharan
(74) Attorney, Agent, or Firm—Fay, Sharpe, Fagan, Minnich & McKee, LLP

(57) ABSTRACT

An evaporation product discharged from a lower end a falling-film evaporator enters a downpipe (7), makes a 180° turn at a bottom of the downpipe, and moves upward through an annular rising channel (9) defined between the downpipe and an intermediate housing (10). As the evaporation product moves along a spiral path (12) defined by the spiral fins, centrifugal forces urges water droplets and impurities to a radial outward periphery where they pass through openings (13) in the intermediate shell as pure steam continues through the spiral path and out a pure steam outlet (21). A cooling jacket (15) chills a peripheral wall of an outer shell (14) adjacent the holes such that the discharged water droplets condense on the outer shell and flow down a reject water return path to a reject water reservoir at the bottom of the outer shell.

9 Claims, 4 Drawing Sheets

METHOD AND DEVICE FOR THE PRODUCTION OF PURE STEAM

BACKGROUND OF THE INVENTION

The present invention relates to the production of highly pure steam. It finds particular application in conjunction with pure steam generators using falling-film evaporator and rising channel technology for separating water droplets and impurities from the steam and will be described with particular reference thereto.

Most water-borne contaminants do not vaporize as water is boiled and therefore do not pass to the condensate or distillate of a still. The removal of contaminants involves a phase change of the water to water vapor, which typically leaves the impurities behind. However, in the boiling process, small droplets of water still carrying impurities can be carried with the steam. Mineral contaminants and biological contaminants, such as pyrogens, can be suspended in the water droplets carried with the steam. When the water droplets are removed from the steam, the resultant pure steam can have all impurities removed down to a range of 10 parts per trillion.

Highly purified steam is used for various medical purposes, such as the production of pharmaceuticals, demanding sterilization applications, and the production of water for injection, i.e., sterile water with no added substances that is sufficiently pure and free from contamination as to be used in the preparation of parenteral solutions and pharmaceuticals.

One technique for the production of pure steam utilizes a falling-film evaporator. A vertical bundle of evaporation tubes encloses a heating jacket which, in turn, is enclosed by an outer shell defining an annular space between the heating jacket and the outer shell. Water is fed into the evaporator tubes at their upper ends and flows down the inner surface of the tubes evaporating and forming steam. The steam emerges at the lower end of the tube bundle. The flow of steam makes a 180° turn and flows upward in the space between the heating jacket and the annular shell. Fins attached to the outer surface of the heating jacket define a spiral path which leaves a narrow gap between their edges and the inner surface of the shell. As the steam flows upward through the spiraling path, water droplets in the evaporation product are driven to the outer shell by centrifugal force. The droplets adhere to the outer shell and form a film of water flowing downward and forming a pool of liquid at the bottom of the device. From there, a stream of water proportional to the amount of pure steam produced is withdrawn as a reject stream. The water phase in the evaporation product tends to be rich in impurities which are enriched in the reject stream. Pure steam emerging from the top of the spiral path is fed to steam consumption points or to a condenser for producing highly pure water. See, U.S. Pat. No. 3,875,017 issued Apr. 1, 1975 to Saari and Huhta-Koivisto.

In another pure steam generator, the evaporation product emerges from the lower end of the tube bundle and is brought into a circular motion by baffle fins at the bottom of the device. The evaporation product rises in a surrounding annular space which narrows toward the top. A spiral path is arranged at the top of the rising space by fins that reach the inner surface of the outer shell. The droplets accelerated by centrifugal force are collected in an annular channel above the spiral path. A separate tube returns the resulting water phase to the bottom of the device rather than relying on downward flowing reject phase along the inner or outer shell.

In the prior art devices, the steam paths are not easily accessible. The structure of the separator units is closed. Access for corrosion inspection and maintenance is difficult. The inner structure is integral with the pressure vessel shell. The structures cannot be altered without going through the tedious procedure involved with pressure vessel construction.

The present application presents a new and improved pure steam generation technique which overcomes the above-referenced problems and others.

SUMMARY OF THE INVENTION

In accordance with one aspect of the present invention, a falling-film evaporator includes a vertical tube bundle and a heating jacket. The evaporation product emerges from a lower end of the tube bundle.

A device for separating water droplets and impurities from the evaporation product includes a length of downpipe through which the evaporation product from the vertical tube bundle initially flows. The evaporation product makes a 180° turn and enters a rising channel between an outer surface of the down pipe and an inner surface of an intermediate shell. The down pipe is preferably tapered forming a funnel. Spiral fins disposed in an upper part of the rising channel set the evaporation product in an upward spiraling circular motion.

The intermediate shell includes at least one opening or outlet slit at the periphery of the spiral path through which droplets are propelled by centrifugal force. A cooled surface of an outer shell is disposed outside the openings to insure that droplets and steam passing through the openings is condensed. Steam condensing on the inner surface of the outer shell creates a radial outward stream that carries steam, water droplets, and impurities on such inner surface. A water film is formed which flows down the surface in the space between the outer and intermediate shells. A pool of water is formed at the bottom of the unit submerging the lower edge of the intermediate shell. A controlled stream of reject water is withdrawn from the pool. The pure, dry steam leaves the upper end of the spiral path and exits the device.

In accordance with another aspect of the present invention, the inner parts are detachable for easy maintenance and cleaning.

One advantage of the present invention is that it enhances the separation of water droplets and impurities in the rising channel of a falling-film evaporator.

Another advantage of the present invention is that the entire apparatus need not be pressure vessel certified.

Another advantage of the present invention is that it facilitates maintenance and cleaning.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
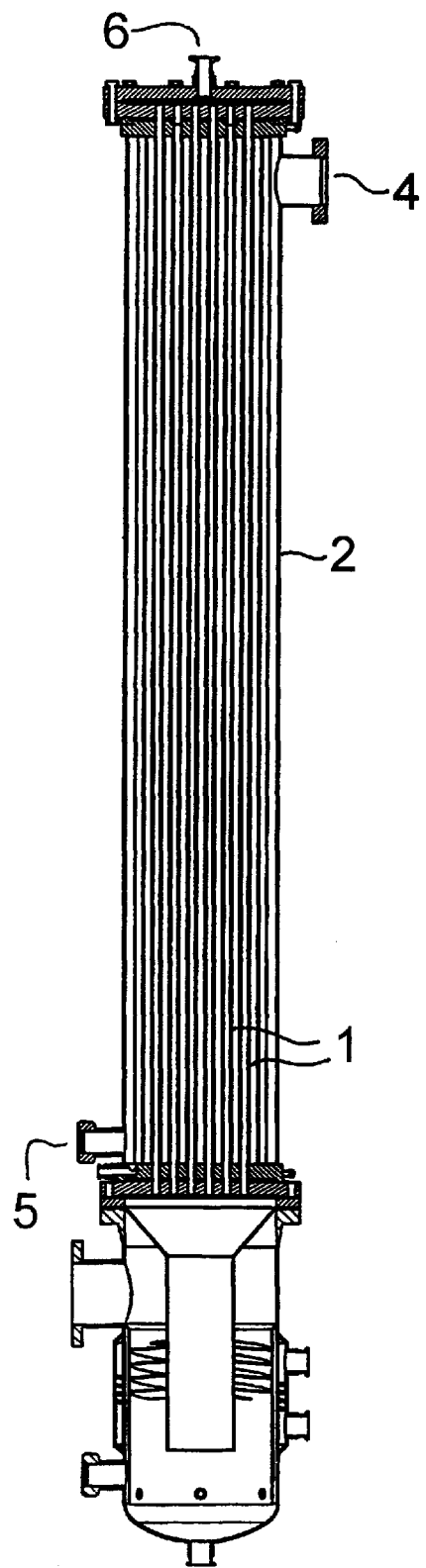
FIG. 1 is a side, cross-sectional view of a falling-film evaporator steam generator with a separator unit according to the present invention.

With reference to FIG. 1, a shell-and-tube heat exchanger is arranged in a vertical position to form a falling-film evaporator. Evaporation tubes 1 are enclosed within a jacket 2 through which a heating medium is conducted between inlet 4 and outlet 5. Feed water enters upper ends of the evaporator tubes 1 through an inlet 6. A separating device is connected at the lower end of the evaporator tubes.

Figure 2:
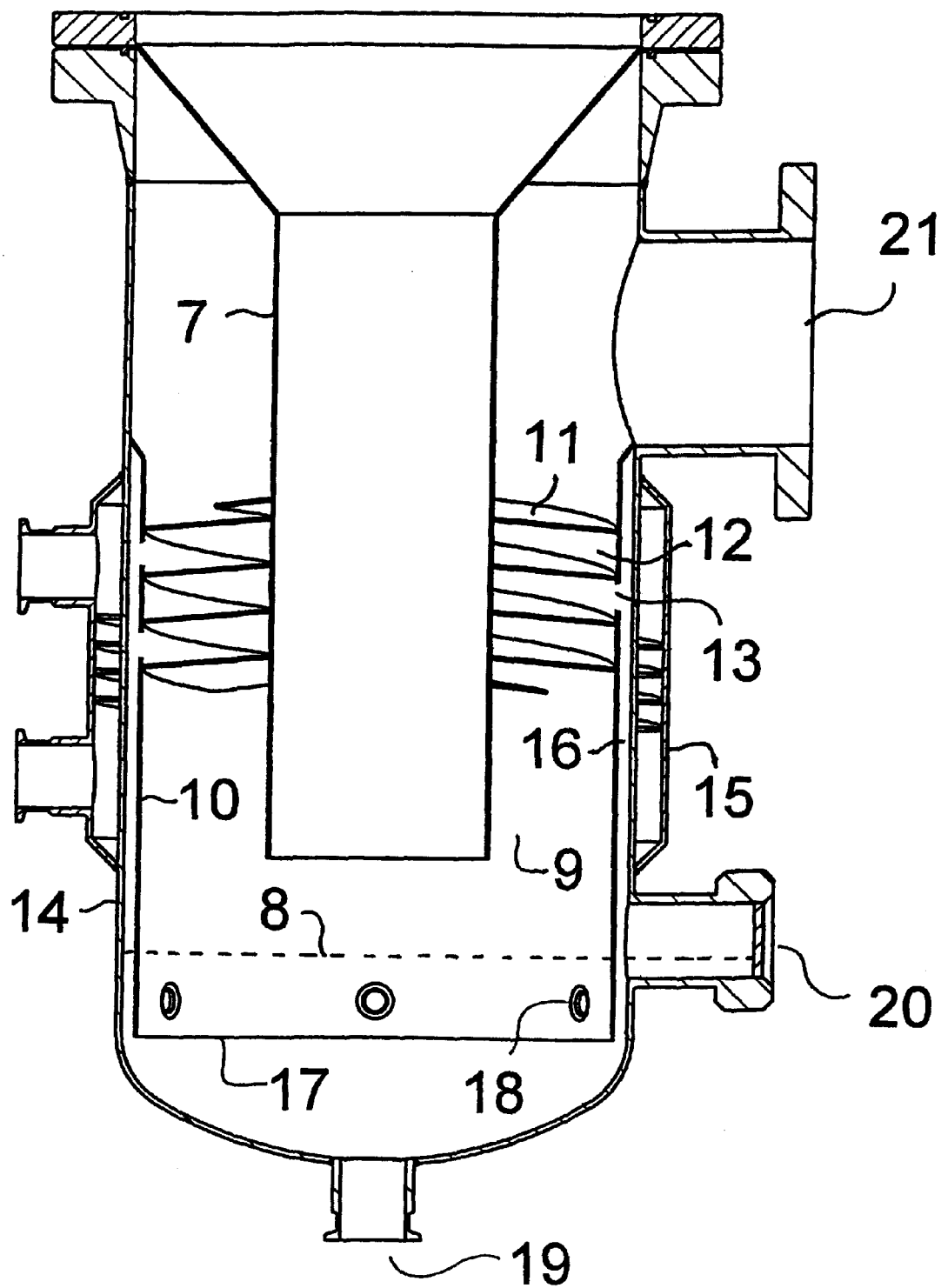
FIG. 2 is a detailed side-sectional view of the separator unit of FIG. 1.

With particular reference to FIG. 2, the separating device includes a downpipe 7 which receives the evaporation product from the evaporator tubes. In the illustrated embodiment, an upper end of the downpipe is tapered as a funnel in order to maintain a common outer diameter in the steam-receiving portion of the separator as in the evaporation product receiving portion of the separator as in the evaporation product discharging portion of the evaporator. The evaporation product emerges from a lower end of the downpipe 7 and encounters a surface 8 of water retained in a lower portion of the separator. The evaporation product turns 180° to enter an annular rising ring channel 9 between the downpipe 7 and an intermediate shell 10. Spiral fins 11 define a spiral path 12 for the evaporation product.

Spiral movement of the evaporation product causes centrifugal force which forces water droplets to the periphery of the spiral path 12. Foreign matter present in the evaporation product may act as nuclei for condensation, which phenomenon enhances the transport of foreign matter to the periphery of the spiral path with the water droplets. Pure, dry steam continues along and exits the spiral path at the top and exits the device at a pure steam outlet connection 21.

At least one opening 13 is defined in the intermediate shell 10 adjacent a periphery of the spiral fins 11 which allows water droplets to enter an annular space 16 defined between the intermediate shell 10 and an outer shell 14. The outer shell 14 is surrounded by a temperature control jacket 15 which cools an inner surface of the outer shell 14. Steam in the annular space 16 condenses on the inner surface of the outer shell and forms a descending water film. The condensation insures that the water droplets do not flow back into the spiral path 12 through the openings 13. A suitable number of openings 13 are provided of an appropriate shape. Droplets and impurities driven to the inner wall of the shell 10 by centrifugal force pass through the openings 13 and are carried to the cooled inner wall of the outer shell 14 by the radial outward stream caused by the condensation of steam.

The openings 13 in one embodiment are vertical slits in the intermediate shell 10 along the outer periphery of the spiral path 12. As another embodiment, one or more slits run parallel to the spiral fins. Circular, oval, and other shape openings are contemplated as are edge enhancements to capture the droplets moving in the circular motion along the spiral path.

The surface 8 of the pool of water formed from condensate and droplets is kept above a lower edge 17 of the intermediate shell 10. This limits the flow of the evaporation product to flow along the spiral path 12 as described above. Spacer indents 18 are preferably provided to center the lower end of the intermediate shell. A reject flow rich in impurities is withdrawn through reject outlet 19. Optionally, a sight glass 20 is provided to monitor the water level 8.

Figure 3:
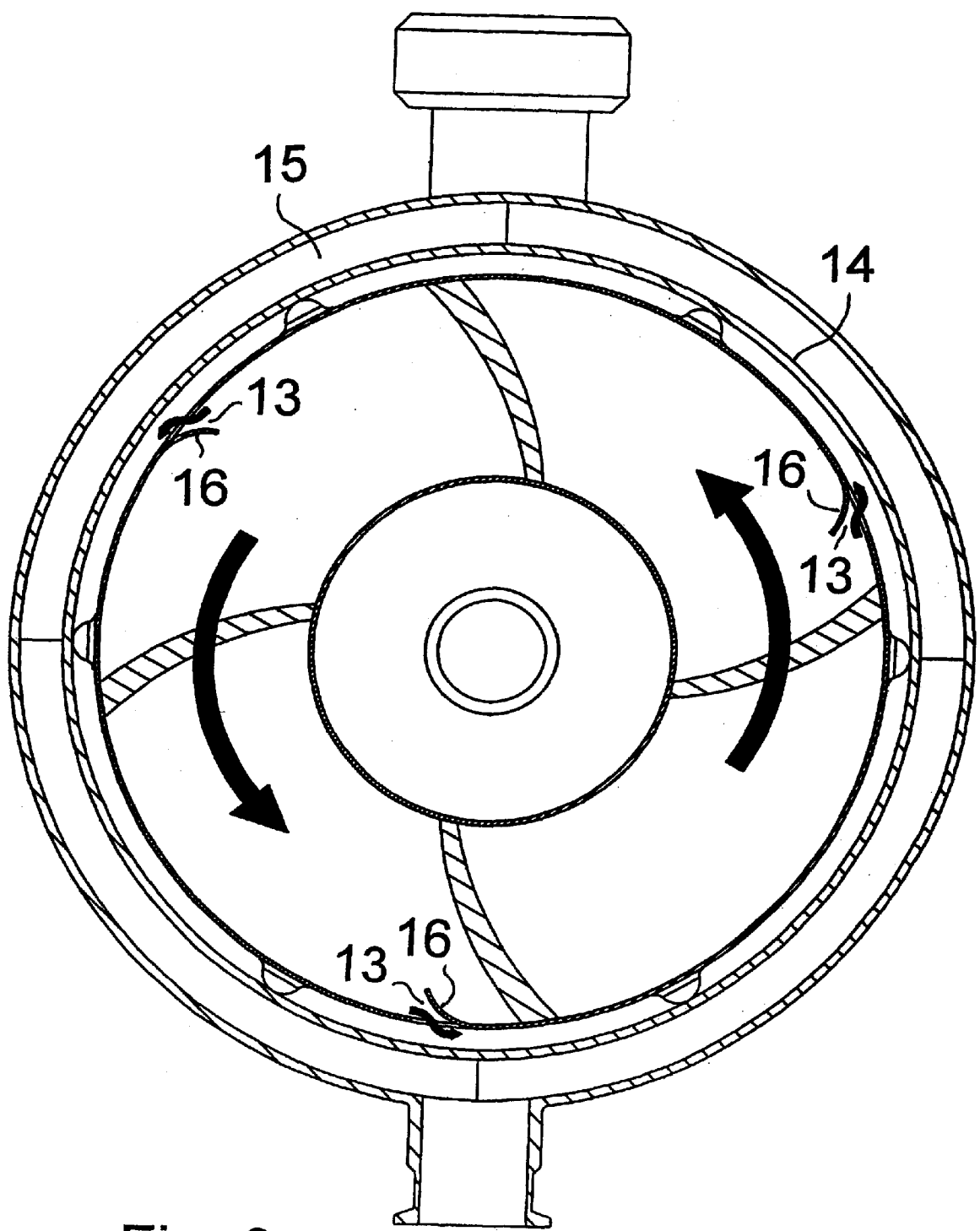
FIG. 3 is a top-sectional view of the separator unit of FIG. 2.

With reference to FIG. 3 and continuing reference to FIG. 2, large arrows indicate the circular movement of the evaporation product along the spiral path 12. The openings 13 are defined immediately upstream of inward projecting baffles 16 which enhance the capture of droplets and impurities carried to a periphery of the spiral path, as illustrated by the small arrows.

Preferably, the temperature of the outer shell 14 is controlled to effect a suitable rate of condensation. To conserve energy, the feed water flowing to the inlet 10 can be circulated through the jacket 15. By controlling the temperature of the outer shell 14, the rate of concentration and the amount of reject water formed can be controlled in accordance with selected load or throughput and purity specifications.

Figure 4:
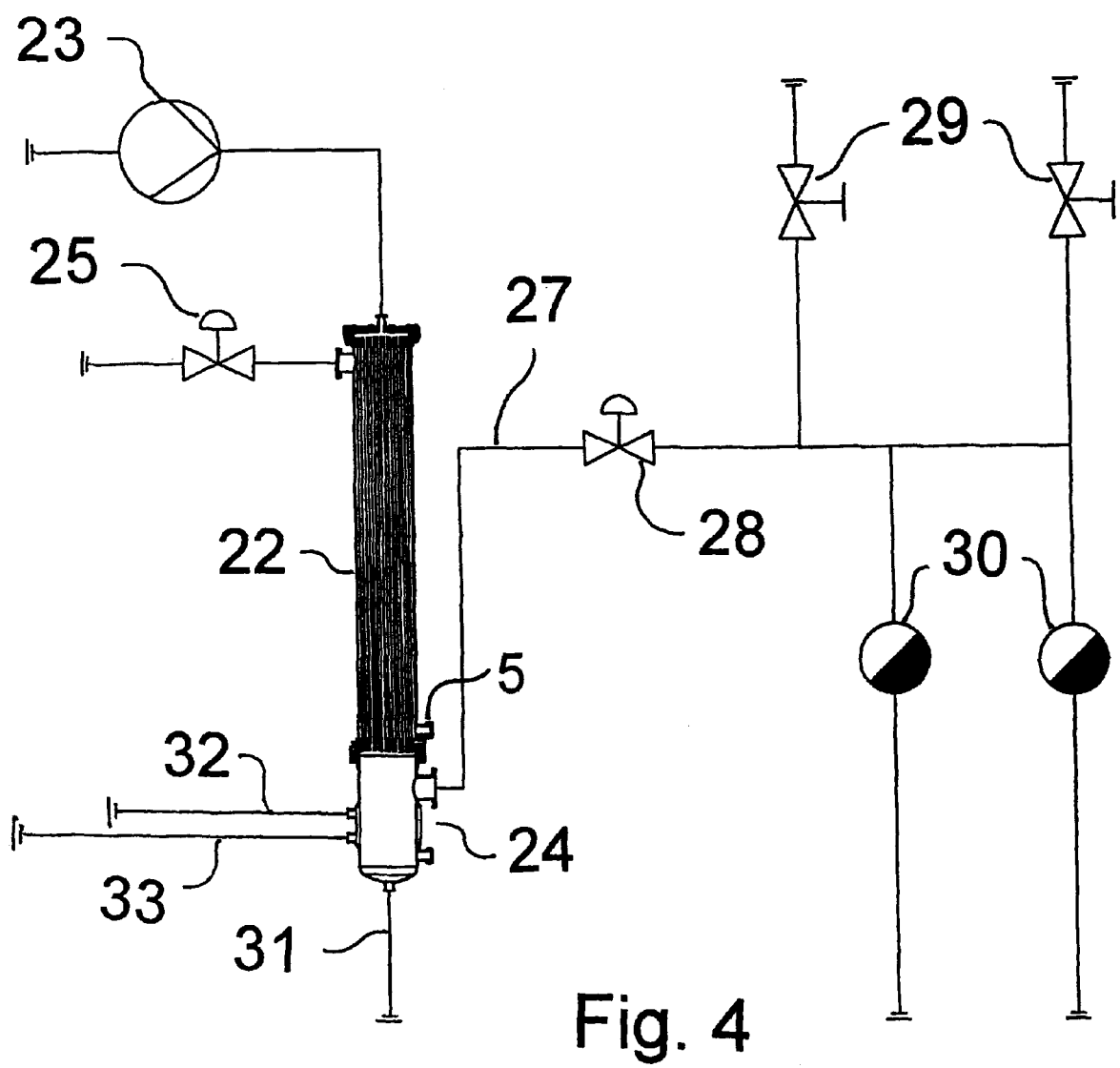
FIG. 4 is a diagrammatic illustration of a pure steam production system including the steam generator of FIGS. 1–3.

With reference to FIG. 4, a pump 23 provides feed water to the feed water inlet 6 of the falling-film evaporator 22 which includes the evaporation tubes and jacket assembly and a separating unit 24. Heating steam passes through valve 25 to the heating medium inlet 4 and condensate leaves by the outlet 5 through suitable tubing (not shown). The pure steam leaves the evaporator unit 22 through the pure steam product outlet 21, an outlet line 27, and a control valve 28. The pure steam product enters a distribution network which includes pure steam line supply valves 29 and pure steam traps 30. The reject water enriched with impurities leaves the separating unit 24 through the reject feed outlet 19 and a drain line 31. A feed line 32 and a return line 33 provide cooling water circulation through the temperature control jacket 15. Optionally, the return line 33 is connected with an inlet to the pump 23.

It will be noted that only the outer shell 14 need fulfill pressure vessel requirements. The inner parts, including the downpipe 7, the intermediate shell 10, and the spiral fins 11 are manufactured from any specified corrosion resistant material and can be readily removed for cleaning, inspection, and replacement. Suitable materials for the inner parts include fluorocarbon polymers, ceramic materials, specialty steels, and other metals. Because these parts are not welded to the pressure vessel outer shell 14, the materials need not be amenable to welding operations. The ready access to the inner parts enables them to be interchanged with parts of other dimensions to accommodate different selected throughputs and purity specifications.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for purifying an evaporation product to produce purified steam, the apparatus comprising:
    a falling film evaporator;
    a downpipe for receiving the evaporation product from the falling-film evaporator;
    a pressure vessel defined by an outer shell, the outer shell surrounding the downpipe and defining a reject water reservoir in a lower portion thereof, an upper surface of the reject water reservoir being disposed below and spaced from a lower end of the downpipe;
    an intermediate shell mounted in the pressure vessel outer shell to define a condensate return path therebetween and surrounding the downpipe, a lower end of the intermediate shell being disposed below an upper surface of the reject water in the reject water reservoir;

a rising channel including spiral fins mounted between the downpipe and the intermediate shell to define a spiral path for the evaporation product to rise upward therethrough;

at least one aperture in the intermediate shell adjacent the spiral fins such that water droplets and contaminants in the evaporation product moving along the spiral path are propelled centrifugally through the aperture;

a cooling jacket on the outer shell vertically aligned with the fins and displaced from the intermediate shell for actively cooling a surface of the outer shell to condense water droplets which passed through the at least one aperture.

2. The apparatus as set forth in claim 1, wherein at least one of the downpipe, the spiral fins, and the intermediate shell are removable from the pressure vessel.

3. The apparatus as set forth in claim 1 wherein the downpipe, the spiral fins, and the intermediate shell are fabricated of a different material from the pressure vessel.

4. The apparatus as set forth in claim 1 wherein the outer shell defines an inwardly projecting baffle adjacent the aperture to divert droplets and impurities moving along a peripheral edge of the spiral path through the at least one aperture.

5. The apparatus as set forth in claim 1 wherein the falling-film evaporator has an inlet for receiving feed water and an outlet which supplies evaporation product through the downpipe; and further including:

an interconnection between the cooling jacket and the feed water inlet such that the feed water cools the cooling jacket and is warmed by the condensate prior to entering the falling-film evaporator inlet.

6. The apparatus as set forth in claim 1 further including a pressure vessel outlet disposed at a lower end thereof for selectively removing the reject water to maintain the upper surface of the reject water reservoir between the lower end of the downpipe and above the lower end of the intermediate shell.

7. A method for purifying an evaporation product to produce purified steam, the method comprising:

evaporating water with a falling film evaporator to generate an evaporation product;

flowing the evaporation product from the falling film evaporator downward through a downpipe into a pressure vessel;

collecting condensed reject water in a lower portion of the pressure vessel below a lower end of the downpipe;

flowing the evaporation product from the pressure vessel upward through a rising channel which surrounds the downpipe;

with fins in the rising channel, causing the evaporation product to follow a spiral path upward through the rising channel;

propelling water droplets and contaminants in the evaporation product flowing along the spiral path centrifugally through at least one aperture defined in an inner shell surrounding the rising channel;

actively cooling a surface of an outer shell which surrounds the inner shell at least adjacent the at least one aperture;

condensing water droplets which have passed through the inner shell aperture on the cooled surface of the outer shell, the water droplets which have condensed on the cooled surface flowing downward along the cooled surface to the lower portion of the pressure vessel;

discharging the evaporation product from the rising channel to produce the purified steam.

8. The method as set forth in claim 7 further including:

actively cooling the cooled surface with feed water;

passing the feed water from the cooled surface to an inlet of the falling film evaporator;

evaporating the feed water in the falling film evaporator to form the evaporation product.

9. The method as set forth in claim 7 further including:

intermittently removing the reject water from the lower portion of the pressure vessel.

* * * * *